US011059674B2

(12) United States Patent
Collin et al.

(10) Patent No.: US 11,059,674 B2
(45) Date of Patent: Jul. 13, 2021

(54) METHOD FOR SEQUENCING LOADS IN AN AUTOMATED DISTRIBUTION SYSTEM, WITH REDUCTION OF DISORDER DURING A COLLECTION OF LOADS ON A COLLECTOR

(71) Applicants: Savoye, Dijon (FR); Universite De Technologie De Compiegne, Compiegne (FR)

(72) Inventors: Jean-Michel Collin, Merceuil (FR); Blandine Vacher, Neuilly-le-Real (FR); Antoine Jouglet, Compiegne (FR); Dritan Nace, Compiegne (FR)

(73) Assignees: SAVOYE, Dijon (FR); UNIVERSITE DE TECHNOLOGIE DE COMPIEGNE, Compiegne (FR)

( * ) Notice: Subject to any disclaimer, the term of this patent is extended or adjusted under 35 U.S.C. 154(b) by 0 days.

(21) Appl. No.: 16/784,949

(22) Filed: Feb. 7, 2020

(65) Prior Publication Data

US 2020/0255225 A1  Aug. 13, 2020

(30) Foreign Application Priority Data

Feb. 8, 2019 (FR) ...................................... 1901297

(51) Int. Cl.
*B65G 43/00* (2006.01)
*B65G 1/137* (2006.01)
(Continued)

(52) U.S. Cl.
CPC ........... *B65G 43/00* (2013.01); *B65G 1/1376* (2013.01); *B65G 47/26* (2013.01); *B65G 47/5118* (2013.01); *B65G 2203/0233* (2013.01)

(58) Field of Classification Search
CPC .. B65G 43/00; B65G 1/1376; B65G 47/5118; B65G 2203/0233; B65G 1/1378;
(Continued)

(56) References Cited

U.S. PATENT DOCUMENTS 8,327,609 B2   12/2012   Krizmanic et al.
10,322,880 B2   6/2019   Collin et al.
(Continued)

FOREIGN PATENT DOCUMENTS

FR       2915979 A1    11/2008
FR       3031510 A1     7/2016
(Continued)

OTHER PUBLICATIONS

English translation of the Written Opinion dated Nov. 20, 2019 for corresponding French Application No. 1901297, filed Feb. 8, 2019.
(Continued)

*Primary Examiner* — Mark A Deuble
(74) *Attorney, Agent, or Firm* — David D. Brush; Westman, Champlin & Koehler, P.A.

(57) ABSTRACT

A method for sequencing loads in an automated load-distribution system having k sources with k≥2; at least one destination; k FIFO-type source buffer devices, each receiving loads from one of the k sources; a collector collecting the loads coming from the k source buffer devices and transporting them to the at least one destination. The collector has k successive nodes each collecting the loads coming from one of the source buffer devices. The control system processes customer orders listing loads for a given destination and being associated with a sequential order number of destination. The control system: builds a collection list containing n loads to be collected and reducing a disorder of the n loads relative to a rising order of the sequential order numbers of destination; and controlling the collector and the
(Continued)

source buffer devices to collect loads on the collector in compliance with the collection list.

11 Claims, 13 Drawing Sheets

(51) Int. Cl.
*B65G 47/26* (2006.01)
*B65G 47/51* (2006.01)

(58) Field of Classification Search
CPC ...... B65G 1/1373; B65G 37/02; B65G 1/137; B65G 47/52; B65G 47/06; G06Q 10/08; G06Q 10/04
USPC ............ 198/347.1, 347.4; 700/216, 219, 223
See application file for complete search history.

(56) References Cited

U.S. PATENT DOCUMENTS

| | | | |
|---|---|---|---|
| 2015/0066198 A1* | 3/2015 | Valentin ............... | B65G 1/1373 700/216 |
| 2016/0122135 A1* | 5/2016 | Bastian, II ........... | B65G 1/0492 198/347.1 |
| 2017/0152106 A1* | 6/2017 | Hofmann ............. | B65G 1/0407 |
| 2019/0002202 A1 | 1/2019 | Collin et al. | |
| 2019/0152634 A1* | 5/2019 | Almogy ............... | B65G 17/002 |
| 2020/0071077 A1* | 3/2020 | Winkler ................. | B65G 1/06 |

FOREIGN PATENT DOCUMENTS

| | | |
|---|---|---|
| FR | 3045583 A1 | 6/2017 |
| FR | 3051948 A1 | 12/2017 |
| FR | 3058708 A1 | 5/2018 |

OTHER PUBLICATIONS

English translation of the Written Opinion dated Aug. 2, 2019 for corresponding French Application No. 1905216 filed May 17, 2019.
French Search Report and Written Opinion dated Nov. 20, 2019 for corresponding French Application No. 1901297, filed Feb. 8, 2019.
French Search Report and Written Opinion dated Aug. 2, 2019 for corresponding French Application No. 1905216 filed May 17, 2019.
Vacher et al., "Sep. 7, 2018", Jounee du Laboratoire Heudiasyc, Sep. 7, 2018 (Sep. 7, 2018), p. 1, 3, 6, 87, 88, XP055610659, Internet extract URL:file:///C:/Users/RB22846/Desktop/temp/Livret_journee_HDS2018_BD.pdf.
Estivill-Castro C. et al. "Right invarient metrics and measures of presortedness", Discrete Applied Mathematics, Elsevier Science, Amsterdam, NL, vol. 42, No. 1, Feb. 26, 1993 (Feb. 26, 1993), pp. 1-16, XP002488734.
Blandine Vacher et al., "Le probleme d'injection dans un entrepot", ROADEF 2019, Feb. 21, 2019 (Feb. 21, 2019), pp. 1-2, XP055644474.
Blandine Vacher et al., "Optimisation d'un systeme autonome de tri", Feb. 23, 2018 (Feb. 23, 2018), pp. 1-2, XP055644640.
Vacher B., et al., "Heudiasyc laboratory day", Sep. 7, 2018 (Sep. 7, 2018), p. 1, 3, 6, 87, 88, XP055610659, Internet extract URL:file:///C:/Users/RB22846/Desktop/temp/Livret_journee_HDS2018_BD_pdf.
Vacher B., et al., "The injection problem in a warehouse", Feb. 21, 2019 (Feb. 21, 2019), pp. 1-2, XP055644474.
Vacher B., et al., "Optimization of an autonomous sorting system", Feb. 23, 2018 (Feb. 23, 2018), pp. 1-2, XP055644640.

* cited by examiner

Figure 6

METHOD FOR SEQUENCING LOADS IN AN AUTOMATED DISTRIBUTION SYSTEM, WITH REDUCTION OF DISORDER DURING A COLLECTION OF LOADS ON A COLLECTOR

1. FIELD OF THE INVENTION

The field of the invention is that of logistics and especially that of automated load-distribution systems.

More specifically, the invention relates to a method for sequencing loads in such an automated distribution system.

It is considered that the automated distribution system comprises:
- k sources, with k≥2;
- at least one destination;
- k source buffer devices of a FIFO (First-In First-Out) type, each receiving loads coming from one of the k sources;
- a collector collecting loads going out of the k source buffer devices and transporting them to said at least one destination, the collector comprising k successive nodes each configured to collect the loads coming out of one of the k source buffer devices; and
- a control system configured to process customer orders, each customer order listing loads to be extracted from the sources and to be provided to a given destination, ideally in a given rising sequential order of destination (this can be a rising sequential order that is strict, for example "1 2 3 4 5", or not strict, for example "1 1 2 2 2 3 4 4 5"). Each load is associated with a sequential order number of destination.

Thus, it is considered that the loads outgoing from the k source buffer devices form k incoming streams of loads and that the loads after collection on the collector form an outgoing stream of loads, the problem here being that of forming the outgoing stream from the k incoming streams (i.e. grouping together k incoming streams into one outgoing stream).

The control system processes customer orders and outputs instructions making it possible to control (command) elements of the automated distribution system, especially the sources, the FIFO-type source buffer devices, the collector and the destination or destinations. The control system is for example a central warehouse management system or warehouse control system (WCS).

The invention can be applied especially but not exclusively when each source of the automated distribution system is a part of a storage depot (this part is also called a "storage unit" here below in the description) and each destination of the automated distribution system is a customer order preparing station or picking station.

It is clear however that many alternatives can be envisaged without departing from the framework of the present invention. For example, each source can be defined as a depot, a set comprising several storage depots or again as a storage device (less complex than a storage depot).

2. TECHNOLOGICAL BACKGROUND

We shall strive more particularly here below in this document to describe the problems and issues existing in the particular case where the system of automated distribution is used to prepare parcels. The invention is of course not limited to this particular application.

Parcel-preparing systems are more particularly used in firms for the mail-order dispatching and sales of goods in small volumes. The main examples of users of these parcel-preparing automated systems are the suppliers of office equipment, clothing, cosmetic products, tools and spare parts in the mechanical engineering industry. These systems enable the preparation, with minimum labor, in a short time span and with precise stock tracking, of a parcel corresponding to a precise customer order, this customer order relating to different products in different quantities, each of the products with its corresponding quantity being identified by a customer order line (each customer order line defines a storage container in which the desired product is situated).

One example of such an automated parcel-preparing system is described especially in the patent FR2915979A1 filed by the present Applicant. It comprises for example:
- an automated storage depot containing products in storage containers (corresponding to the above-mentioned loads), each storage container being associated with a single product reference (these can also be containers containing a specific customer order and/or a mixture of products);
- a customer order preparing station or picking station, where the products are picked and placed by an operator in a parcel (dispatch container).
- a set of conveyors carrying storage containers, in which the products are located, from the storage depot to the customer-order preparing or dispatch station and vice versa; and
- a warehouse control system (WCS).

The automated storage depot comprises for example four storage units, each storage unit being formed by a lane which, on either side, serves a storage rack (or shelving unit) with several levels of superimposed storage levels, each rack being sub-divided along its length into storage locations (also called cells), each intended to receive a storage container. At each storage level, each lane receives tracks for the movement of a transfer device (also called a collecting and transportation trolley or shuttle) that shifts the storage containers so that they can be positioned within the storage locations and picked from these locations. A track is generally formed by two parallel rails and the trolley is equipped with wheels to move on these rails. The trolleys can not only move horizontally at a given storage level but also be taken from one level of a lane to another when they are carrying or not carrying storage containers, by means of elevators (also called up/down elevators or spiral conveyors or mini-loaders) that are disposed at one or at both ends of the alleys (or even in the middle). These elevators furthermore enable the transfer of a storage container placed on a trolley towards the set of conveyors.

The control system manages the customer order that is associated with each parcel (dispatch container) and lists storage containers (loads) according to the location of these storage containers in the storage depot, the availability of the trolleys and of the storage depot elevators, as well as the sequential order in which these storage containers must follow one another to the customer-order preparing or picking station. The purpose of this is to optimize all the movements and the parcel preparation times and ensure synchronization between the arrival, at the preparing station, of a parcel being prepared and of the storage containers listed in the customer order associated with this parcel being prepared.

Referring now to FIGS. 1A, 1B and 1C (which correspond to three successive states of the processing of a customer order), we present in greater detail a first known solution for processing a customer order (and for sequencing corresponding loads) by means of the control system in the particular context (presented here above) of an automated package-preparing system. For the sake of simplification, not all the constituent elements of the automated distribution system are represented in these figures.

FIG. 1A presents only the extremities of four storage units, A1 to A4, which are part of the automated storage depot and constitute four load-storing sources: a plurality of FIFO (First In First Out) type buffer devices 11 to 14, each placed immediately downstream to one of the four storage units A1 to A4; and a collector 15 (consisting for example of one or more conveyors) collecting, via the nodes 21 to 24, the loads going out of the source buffer devices 11 to 14 and conveying them up to the customer-order preparing station (destination) 16. The collector 15 therefore serves to de-localize the customer-order preparing station 16 relative to the automated storage depot. Indeed, the buildings do not always make it possible to place the customer-order preparing station beside the storage depot.

FIG. 1C presents only: the collector 15; the customer-order preparing station 16 (comprising for example one or more conveyors) and constituting a destination that receives loads; and a FIFO-type destination buffer device 17 placed upstream to the order-preparing station 16, to receive loads through a node 25.

In this example, it is assumed that the customer order lists eight loads in a given sequential order of destination corresponding to the rising order of references 1 to 8 that the loads bear in the figures. In other words, the customer-order preparing station 16 must receive these eight loads in the sequential order of 1 to 8. It is also assumed that the loads referenced 3 and 6 are stored in the source A1, the loads referenced 1 and 2 are stored in the source A2, the loads referenced 4 and 7 are stored in the source A3, and the loads referenced 5 and 8 are stored in the source A4.

To process the above-mentioned customer order, the control system carries out a first "intra-source" scheduling (scheduling before the exit from the sources) in controlling each of the sources A1 to A4 so that the loads of the customer order that are stored therein go out from there according to the given sequential order of destination. Thus, as illustrated in FIG. 1A, the source buffer device 11 (placed downstream relative to the source A1) successively receives the loads referenced 3 and 6. The source buffer device 12 (placed downstream relative to the source A2) successively receives the loads referenced 1 and 2. The source buffer device 13 (placed downstream relative to the source A3) successively receives the loads referenced 4 and 7. The source buffer device 14 (placed downstream relative to the storage unit A4) successively receives the loads referenced 5 and 8.

Then, the control system carries out a second "inter-source" scheduling (scheduling after going out from the sources) by controlling the source buffer devices 11 to 14 and the nodes 21 to 24 so that, when collected on the collector 15, the loads listed in the customer order are placed in the desired sequential order of destination. To this end, the decision rules (injection and forward feed rules) are applied at each of the nodes 21 to 24.

Injection rules: for a load that comes to a node from one of the sources A1 to A4 (via one of the source buffer devices 11 to 14): the load is injected into the collector 15 downstream to this node if this node is the one furthest upstream to the destinations; for a node other than the one furthest upstream to the destinations, the load is injected if no other load having a lower sequential order number of destination is present upstream to this node, in one of the source buffer devices or on the collector, and if no other load having a lower sequential order number of destination is present downstream to this node in one of the source buffer devices connected to the other nodes (if not, it is not injected); for example, even if it is ready to go out of the source buffer device 13 via the node 23, the load referenced 4 is not injected into the collector 15 so long as the loads referenced 1, 2 and 3 are situated upstream to the node 23 in one of the source buffer devices 21 and 22 or on the collector 15.

Forward feed rule: for a load already present on the collector 15 and coming to a node (coming from another upstream node): the load moves forward if no other load having a lower sequential order number of destination is present in the source buffer device connected to this node (if not, it does not move forward); for example, if it is assumed that the load referenced 3 has been placed (injected) in the collector 15, then when it is presented to the node 22, it will not move forward so long as the nodes referenced 1 and 2 are situated in the source buffer device 12 connected to this node 22.

FIG. 1B illustrates the loads referenced 1 to 8 being transported by the main collector 15 after having been collected (placed) in the desired sequential order of destination (1 to 8). As illustrated in FIG. 1C, the control system controls the destination buffer device 17 so that the loads (which enter therein, via the node referenced 25, already sorted in the desired sequential order of destination) come out therefrom at the desired rate in order to be presented to the customer-order preparing station 16.

One drawback of this technique, as illustrated in 1A to 1C (and of its rules of injection and forward feed) is that the fill rate of the collector (and therefore the flowrate when going out of this collector) is not optimal.

In order to overcome the above-mentioned drawback, a second known solution is described in the patent application FR3058708A1 filed by the present Applicant. The general principle of this known solution consists in making a finer analysis than in the first prior-art solution mentioned here above, to decide whether a load coming from a source can be injected at an analyzed node. Thus, in certain cases, the second known solution leads to an injection of the load (while ensuring that there is no risk of inter-blockage), while the first known solution leads to a non-injection of the load. Hence, the second known solution increases the fill rate of the collector (and therefore the outgoing flowrate from the collector). This also reduces waiting times for the loads before they are injected into the collector via the nodes.

The first and second known solutions described here above however have two drawbacks:
  they impose strong constraints on the sources since the "intra-source" scheduling (i.e. before coming out of the sources) dictates, on each of the sources, that for a given customer order, the loads that come out therefrom are scheduled in compliance with the rising order of the sequential order numbers of destination of the loads; and
  they impose strong constraints on the source buffer devices and the collector since the "inter-source" scheduling (i.e. after going out of the sources) dictates, during the collection of the loads on the collector, a compliance with the rising order of sequential order numbers of destination of the loads (in other words, there is no possible disorder for the loads at the end of the collection on the collector).

In order to overcome these drawbacks, there is a third known solution which aims to eliminate the above-mentioned heavy constraints on the sources, the source buffer devices and the collector. The control is such that, if there is a free space on the collector for a load ready to come out of a source buffer device, then the load is collected on the collector. With this third known solution, the loads can come out of the sources in disorder and can be collected on the collector in disorder. However, if the rising order of the sequential order numbers of destination of the loads must be complied with at the arrival of the loads at the destinations, then it is necessary to carry out a sequencing (also called a scheduling), i.e. a re-ordering according to the desired sequential order of destination, of the loads after they are collected on the collector. To this end, at least one load-sequencing and buffer storage system (or device) is placed between the collector and the destination or destinations. Examples of such sequencing and buffer storage systems are described in the patent applications FR3051948A1, FR3045583A1 and FR3031510A1 filed by the present Applicant (their content is inserted herein by reference).

The third known solution however has, for its part, drawbacks too:

- waiting for a free place on the collector can lead to an undesired accumulation of loads in one or more of the source buffer devices (especially the one situated furthest downstream to the collector);
- the stream of loads coming out of the collector can become jerky, which means that the full mechanical capacity of the collector is not used (the loads are more spaced out between one another on the collector than is necessary, causing loss of space and reducing the rate of production at the end of the line); and
- the sequential order of collection of loads on the collector does not take account of the rising order of the sequential order numbers of destination; any re-ordering of the loads, if necessary, relies entirely on the load-sequencing and buffer storage system placed between the collector and the destinations. This further increases the complexity and capacity of a load-sequencing and buffer storage system.

3. SUMMARY

In one particular embodiment of the invention, a method is proposed for sequencing loads, implemented by a control system in an automated load distribution system comprising:

- k sources, with $k \geq 2$;
- at least one destination;
- k source buffer devices of a "first-in first-out" type, each receiving loads coming from one of the k sources;
- a collector collecting loads coming out of the k source buffer devices and transporting them to said at least one destination, the collector comprising k successive nodes each configured to collect the loads coming out of one of the source buffer devices; and
- said control system configured to process customer orders, each customer order listing loads for a given destination and being each associated with a sequential order number of destination;

said control system carrying out the following steps:

- building a collection list containing n loads to be collected and reducing a disorder of said n loads relative to a rising order of the sequential order numbers of destination, said n loads being contained in the source buffer devices, with $n = \sum_{i=1}^{i=k} p(i)$, $p(i)$ being a number of loads to be collected in the $i^{th}$ source buffer device; and
- controlling the collector and the source buffer devices to carry out a collection of loads on the collector in compliance with said collection list.

Thus, the proposed solution proposes a wholly novel and inventive approach in which the control system controls the collector and the source buffer devices to carry out a collection, under a light constraint of compliance with a rising order of sequential order numbers of destination, of the loads coming out of the source buffer devices. Infringing this light constraint generates disorder during the collection of loads on the collector and the proposed solution reduces this disorder.

Thus, the proposed solution mitigates both the drawbacks of the first and second known solutions and the drawbacks of the third known solution. In particular, the proposed solution does not impose (lay down) the above-mentioned strong (heavy) constraints on the sources, the source buffer devices and the collector but only a light constraint (i.e. a constraint that can be infringed causing, in this case, a disorder that it is sought to reduce) on the source buffer devices and the collector. Besides, the reduction of the disorder during the collection facilitates the work of the destinations (if these destinations do not impose compliance with the rising order of the sequential order numbers of destination of the loads that reach these destinations) or else reduces the work of the load-sequencing and buffer storage system (if there is one which is placed between the collector and the destination or destinations to ensure compliance with the rising order of the sequential order numbers of destination of the loads arriving at the destination or destinations).

According to one particular characteristic, the step for building the collection list comprises the following steps:

(a) initializing a first set of states E1 with a single state $e_{init} = (U_{init}, L_{init})$, where $U_{init}$ is a k-tuplet containing k zeros and $L_{init}$ is an empty list;

(b) initializing a second set of states E2 with an empty value;

(c) for each building step among n successive building steps:

(c.1) for each state e of E1, with $e = (U, L)$, where U is a k-tuplet containing k elements, $U = (z_1, \ldots, z_k)$ with $z_i$ a number of loads taken from the $i^{th}$ source buffer device, $i \in \{1, \ldots, k\}$, and L is a list of loads associated with U:

(c.1.1) for each value of $f \in \{1, \ldots, k\}$:

(c.1.1.1) if $U(f) < p(f)$, with $U(f)$ being a number of loads of the $f^{th}$ source buffer device contained in L, and $p(f)$ is the number of loads to be collected in the $f^{th}$ source buffer device:

-i- creation of a new state $e_N = (U_N, L_N)$ starting from $e = (U, L)$, in adding 1 to $U(f)$ and in adding, at the end of L, the load occupying the $(U(f)+1)^{th}$ position in the sequence of loads contained in the $f^{th}$ source buffer device;

-ii- computing a value of disorder d of the list $L_N$ of the new state $e_N$, with a function of computation of disorder relative to a rising order of the sequential order numbers of destination;

-iii- if E2 contains another new state $e'_N = (U'_N, L'_N)$, with $U'_N = U_N$ and d' a value of disorder of the list $L'_N$: if $d < d'$, $e_N$ replaces $e'_N$ in E2, and if $d \geq d'$, $e_N$ is not inserted into E2;

-iv- if E2 does not contain said other new state $e'_N$, $e_N$ is inserted into E2;

(c.2) if the building step is not the $n^{th}$ building step: E2 becomes the new set of states E1 and the method passes to the next building step;

(c.3) if the building step is the $n^{th}$ building step: E2 contains a single final state $e_F=(U_F,L_F)$ and $L_F$ forms said collection list.

Thus, the control system can build the collection list simply and automatically with high performance (in terms of computation time, complexity, etc.).

According to one particular characteristic, at the step (c.1.1.1), the control system also verifies whether $N(f)<y_f$, with $N(f)$ being the longest sequence of loads of the $f^{th}$ source buffer device placed consecutively in L, and $y_f$ being a predetermined threshold. In addition, the steps (i) to (iv) are carried out only if $U(f)<p(f)$ and $N(f)<y_f$.

In this way, the number of loads collected consecutively in the same source buffer device is limited. This balances the provenance (in terms of sources and source buffer devices) of the loads in the collection list.

According to one particular characteristic, the step -ii- is followed by the following step:

-iia- if $d>d_H$, with $d_H$ being a predetermined value, the new state $e_1$ is not inserted into E2 and the steps (iii) and (iv) are not carried out.

This simplifies the computations made by the control system (fewer states to manage).

According to one particular characteristic, the predetermined value $d_H$ is computed as follows:

building a reference list $L_H$ containing said n loads and built as follows:
  the first load of $L_H$ is a load having the smallest sequential order number of destination among the loads truly ready to exit from the k source buffer devices;
  each following load of $L_H$ is the load having the smallest sequential order number of destination among the loads that are ready to go out of the k source buffer devices, assuming fictitiously that the preceding loads of $L_H$ have come out of the k source buffer devices;
  computing $d_H$ as a value of disorder of the list $L_H$ with said disorder computing function.

Thus, to compute the predetermined value of disorder $d_H$, we use a heuristic method (a computation method that rapidly gives a solution that is not necessarily the optimal solution). The proposed heuristic method is simple to implement.

In one particular implementation, said disorder computing function, for a list M of q loads, is written:

$H(M)=\Sigma_{i=1}^{i=q}[(i-1)-K(i)]$, with K(i) being the number of loads of the list M placed before the $i^{th}$ load of the list M and having a sequential order number of destination smaller than or equal to the sequential order number of the $i^{th}$ load of the list M.

The disorder computing function H(M) offers a high-performance solution for the computing of disorder as compared with a strict rising order (for example "1 2 3 4 5") or non-strict rising order (for example, "1 1 2 2 2 3 4 4 5") of the sequential order numbers of destination.

In variants of implementation, other functions for computing disorder can be used (see below).

According to one particular characteristic, the loads of a given customer order must reach a given destination in a given rising sequential order of destination, and said control system carries out a step for controlling at least one sequencing device, placed between the collector and said at least one destination, to make a correction of the disorder of the n loads.

Thus, in this case, the proposed solution ensures compliance with the rising order of the sequential order numbers of destination of the loads reaching the destination or destinations. In addition, as mentioned further above, the proposed solution in this case reduces the work of the load-sequencing and buffer storage system (as compared with the third prior-art solution). Indeed, the scheduling work is done partly by the particular mechanism of collection, by the collector, of the loads coming from the source buffer devices and partly by the sequencing and buffer storage system.

According to one particular characteristic, the control system performs the following step, before the step for building the collection list, for at least one group of R successive loads contained in one of the source buffer devices, with R being an integer greater than or equal to 2: computing a substitute sequential order number of destination as a function of the sequential order numbers of destination of the R loads. In addition, for the execution of the step for building the collection list, the control system uses the substitute sequential order number of destination for each of the R loads.

In this way, the loads of a same group of R loads will succeed one another in the collection list. This makes it possible, for example in order to comply with high-performance mechanical constraints, to set the pace accordingly for the entry of these R loads into the concerned source buffer device (and also the exit of these R loads out of the source concerned).

According to one particular characteristic, the computation of a substitute sequential order number of destination as a function of the sequential order numbers of destination of the R loads comprises:
  computing an average value of the sequential order numbers of destination of the R loads;
  computing a value of disorder of the R loads as a function of the sequential order numbers of destination of the R loads;
  if the value of disorder of the R loads is above a predetermined threshold, the substitute sequential order number of destination is the average value rounded up to the next integer; if not, the substitute sequential order number of destination is an average value rounded down to the next integer.

This simplifies the computation, made by the control system, of a substitute sequential order number of destination.

According to one particular characteristic, a new execution of the steps of the method is launched if an entry of at least one new load into one of the source buffer devices prompts a modification of the loads to be collected in said source buffer device and therefore of the n loads to be collected in all the k source buffer devices.

In this way, the proposed solution can be used dynamically with a new execution of the method as soon as there is a change of the n loads to be collected.

Another embodiment of the invention proposes a computer program product comprising program code instructions for implementing the above-mentioned method (in any of its different embodiments) when said program is executed on a computer.

Another embodiment of the invention proposes the use of a computer-readable and non-transient storage medium storing a computer program comprising a set of instructions executable by a computer to implement the above-mentioned method (in any one of its different embodiments).

Another embodiment of the invention proposes an automated load distribution system comprising:

k sources with k≥2;
at least one destination;
k source buffer devices of a "first-in first-out" type, each receiving loads coming from one of the k sources;
a collector collecting loads going out of the k source buffer devices and transporting them towards said at least one destination, the collector comprising k successive nodes each configured to collect the loads going out of one of the k source buffer devices; and
a control system configured to process customer orders, each customer order listing loads for a given destination and each being associated with a sequential order number of destination;
said control system comprising a computation machine configured to:
build a collection list containing n loads to be collected and reducing a disorder of said n loads relative to a rising order of the sequential order numbers of destination, said n loads being contained in the source buffer devices, with $n=\Sigma_{i=1}^{i=k} p(i)$, $p(i)$ being a number of loads to be collected in the $i^{th}$ source buffer device; and
control the collector and the source buffer devices for a collection of loads on the collector compliant with said collection list.

Advantageously, the control system comprises means of implementation of the steps that it performs in the method for sequencing loads as described here above in any one of its different embodiments.

4. LIST OF FIGURES

Other features and advantages of the invention shall appear from the following description, given by way of an indicative and non-exhaustive example and from the appended drawings of which:

FIGS. 1A, 1B and 1C, already described with reference to the prior art, illustrate three states (loads before collection on the collector, loads after collection on the collector, and loads arriving at the picking or preparing station after coming out of the collector) of the processing of a customer order with the first known solution;

FIG. 2 presents a block diagram of an example of an automated distribution system in which it is possible to implement a load-sequencing method according to the invention;

FIG. 3 presents a flowchart of a load-sequencing method according to one particular embodiment of the invention;

FIG. 4 presents the structure of a control system according to one particular embodiment of the invention;

FIG. 6 illustrates an example of a state tree browsed by the algorithm of FIG. 5;

5. DETAILED DESCRIPTION

In all the figures of the present invention, the identical elements and steps are designated by same numerical references.

Figure 1C:
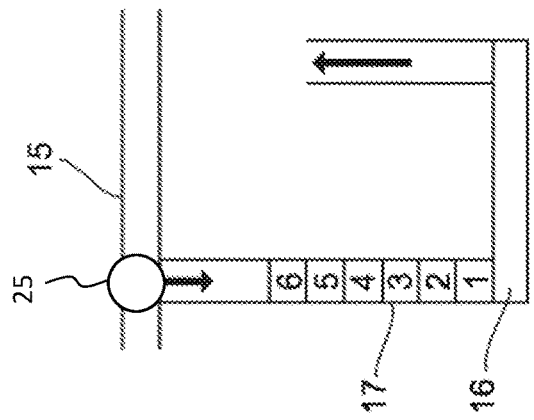
Figure 1B:
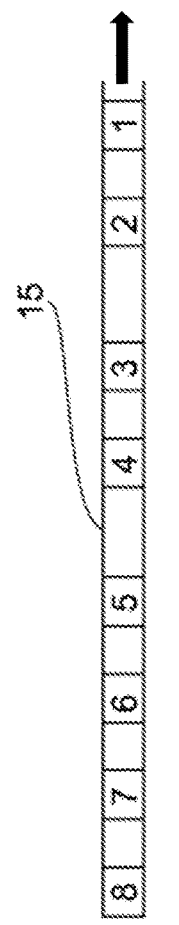
Figure 1A:
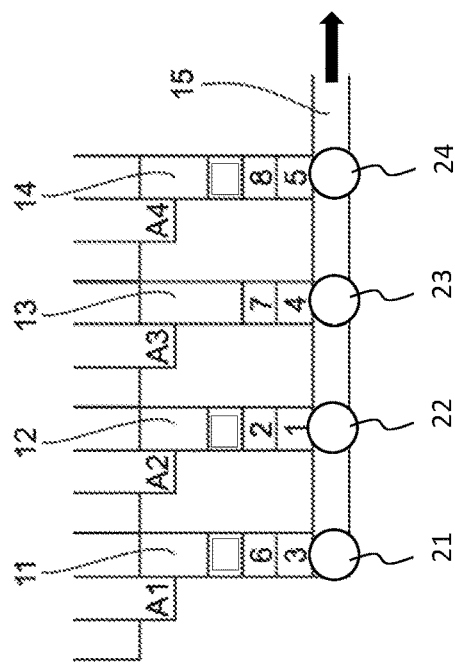
Figure 2:
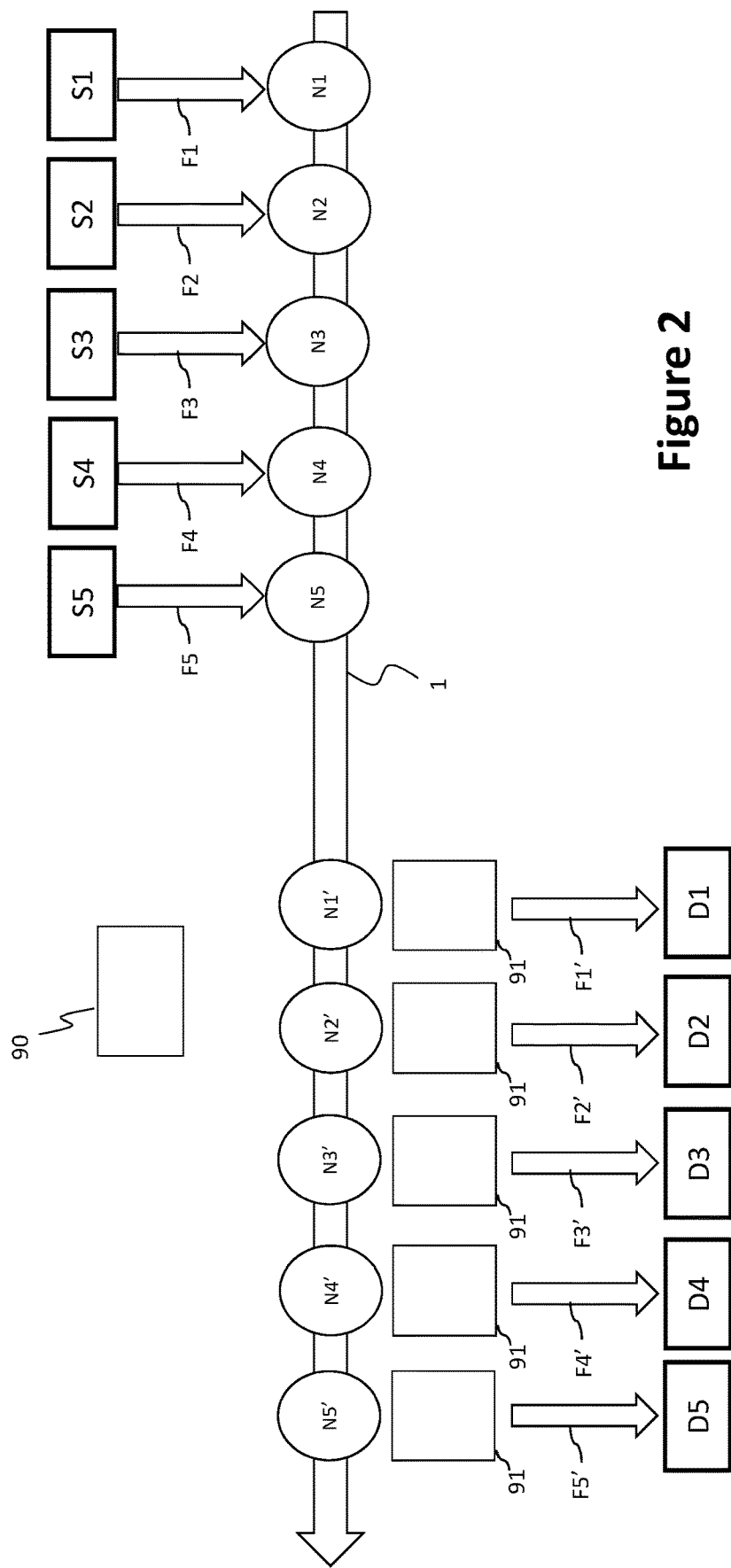

FIG. 2 presents a block diagram of an example of an automated distribution system in which it is possible to implement a load-sequencing method according to the invention. In this example, the system comprises five source S1 to S5 (for example, different parts (storage units) of a storage depot), five destinations D1 to D5 (for example customer order picking or preparing stations), a collector 1 (composed for example of one or more conveyors), sequencing and storage buffer devices or systems 91 and a control system 90 (for example of the WCS type). In this example, the number of sources and the number of destinations are given purely as an illustration. More generally, the system comprises k sources with k≥2, and at least one destination.

As already explained further above, the collector 1 is configured to transport loads up to each destination and comprises a plurality of successive nodes: those referenced N1 to N5 are each configured to collect loads coming out of one of the sources S1 to S5 and those referenced N1' to N5' are each configured to direct loads towards one of the destinations D1 to D5. Each of these nodes comprises for example a 90-degree or 45-degree transfer device.

Each of the sources S1 to S5 is for example connected to one of the nodes N1 to N5 by a FIFO type source buffer device F1 to F5. Similarly, each of the destinations D1 to D5 is for example connected to one of the nodes N1' to N5' by a FIFO type destination buffer device F1' to F5'.

Upstream to each destination, a sequencing and buffer storage system 91 enables a final scheduling of the loads in a rising sequential order of destination for this destination. As described in detail further below, it is accepted that, at the end of the collection of loads on the collector, these loads are in disorder (relative to the rising sequential order of destination). The sequencing and buffer storage system 91 eliminates this disorder.

In one variant, the constraint is more flexible as regards the destinations and it is accepted that the rising order of sequential order numbers of destination is not complied with by the loads arriving at this destination. In this variant, the sequencing and buffer storage system 91 upstream to each destination is either omitted (not present) or used to carry out a final scheduling that can only be partial (i.e. that sometimes only reduces the above-mentioned disorder without eliminating it).

In another variant, there are not several sequencing and buffer storage systems 91 (one just upstream to each destination and downstream to the collector 1) but only one sequencing and buffer storage system 91 (upstream to the set of destinations).

The control system 90 is configured to process customer orders each listing loads to be extracted from the sources and ideally (see discussion here above) to be provided, in a given rising sequential order of destination, to a given destination.

For example, it implements the load-sequencing method according to the particular embodiment described here below with reference to FIGS. 5 and 6.

Figure 3:
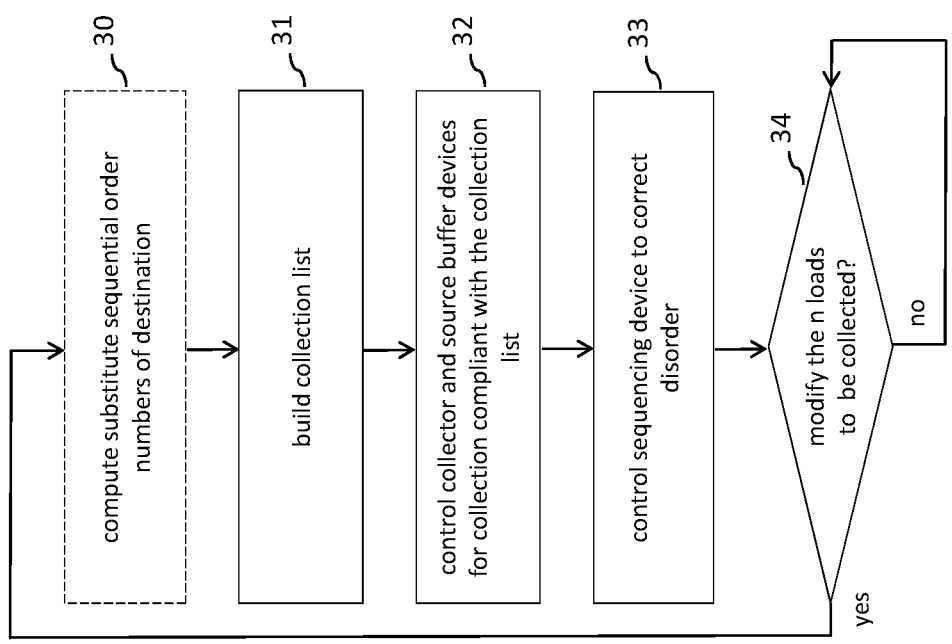

Referring now to FIG. 3, we present a load-sequencing method according to one particular embodiment of the invention. This method is implemented by the control system 90.

In a step 31, the control system 90 prepares a collection list containing n loads to be collected and reducing a disorder of the n loads relative to a rising order of sequential order numbers of destination. The n loads are contained in the source buffer devices F1 to F5. We have: n=p(i), with p(i) being a number of loads to be collected in the $i^{th}$ source buffer device. One particular implementation of this step 31 for building the collection list is described here below with reference to FIG. 5.

In a step 32, the control system 90 controls the collector 1 and the source buffer devices F1 to F5 so that a collection of loads (on the collector) is carried out in compliance with the collection list.

If the loads of a given customer order must arrive at a given destination in a given rising sequential order of destination, a step 33 is carried out in which the control system 90 controls the sequencing and buffer storage systems 91 for a correction of disorder of the n loads.

In a test step 34, the control system 90 verifies that an entry of at least one new load into one of the source buffer devices F1 to F5 prompts a modification of the loads to be collected in this source buffer device and therefore a modification of the n loads to be collected in the set of k source buffer devices. In the event of a positive response at the test step 34 (i.e. in the event of a modification of the set of n loads to be collected), the control system 90 launches a new execution of the steps of the method.

In one variant, the load-sequencing method comprises a preliminary step 30 which is described further below with reference to FIGS. 9A and 9B.

Figure 4:
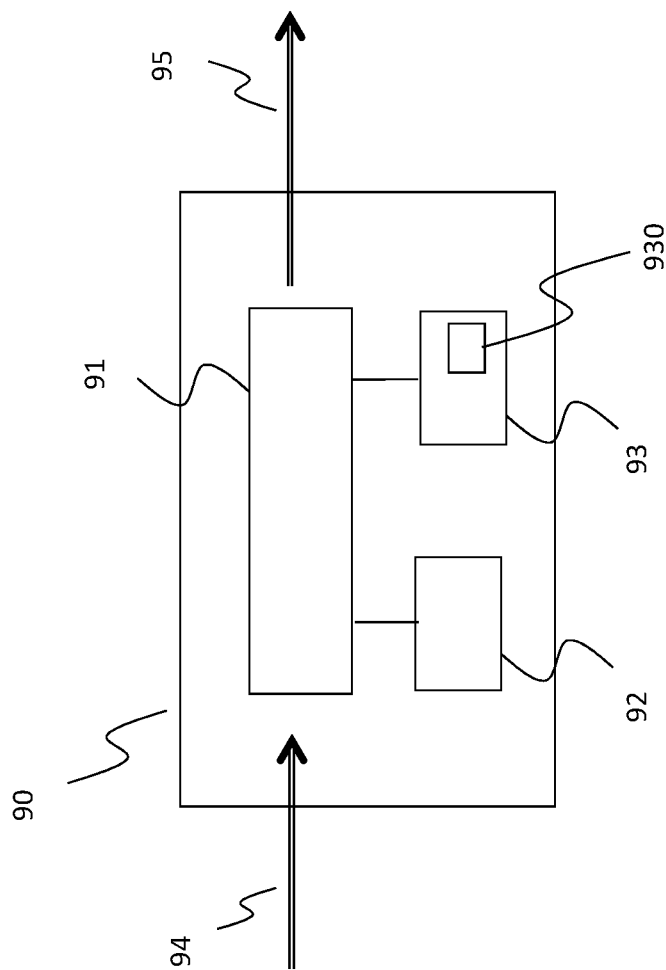

FIG. 4 presents the structure of a control system 90 according to one particular embodiment of the invention. This control system comprises a random-access memory 92 (for example a RAM), a processing unit 91, equipped for example with a processor and driven by a computer program 930 stored in a read-only memory 93 (for example a ROM or a hard disk drive).

Figure 5:
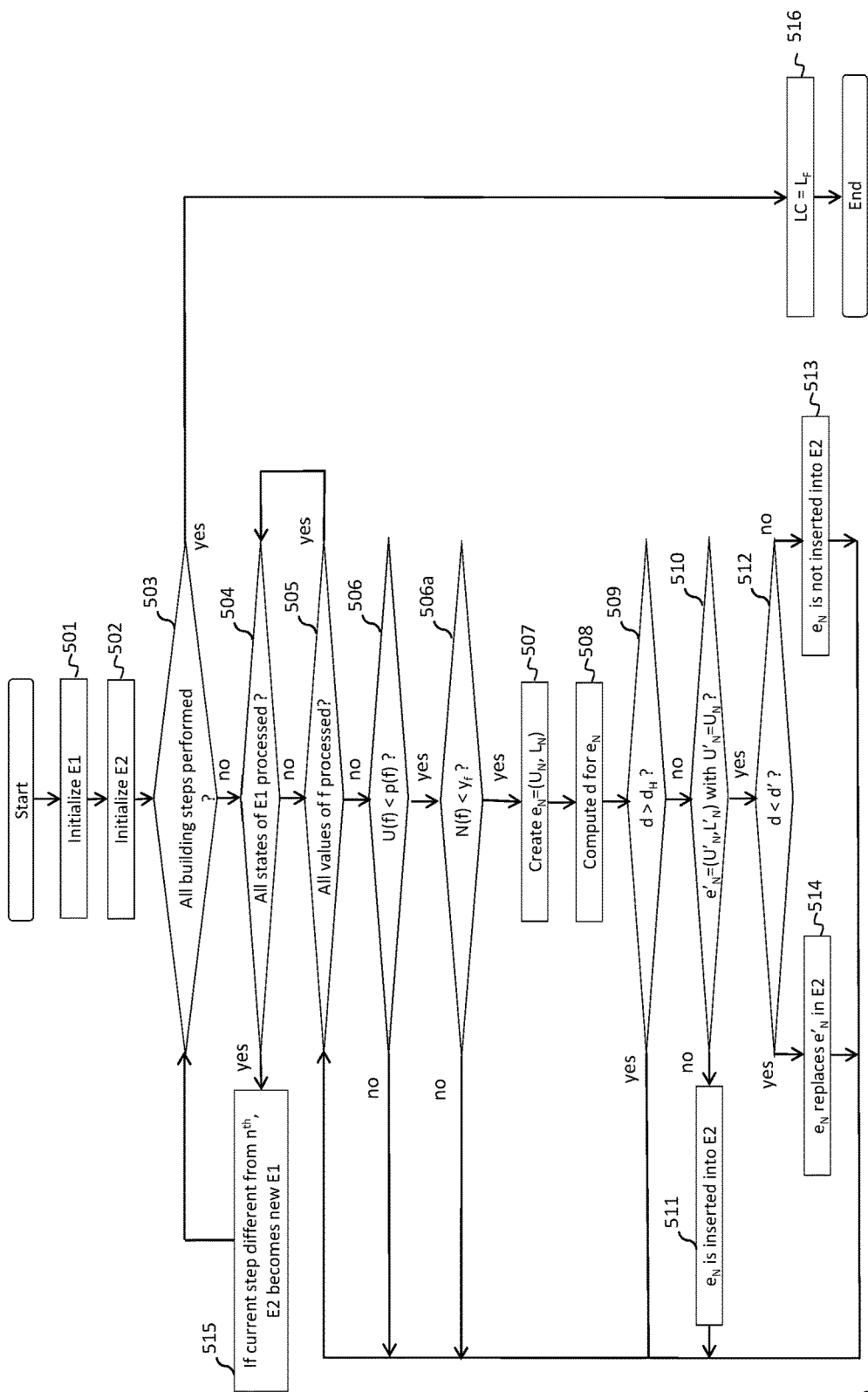
FIG. 5 illustrates an algorithm of a particular implementation of the step 31 of FIG. 3 (building of the collection or picking list)

At initialization, the code instructions of the computer program are for example loaded into the random-access memory 92 and then executed by the processor of the processing unit 91 to implement the load-sequencing method of the invention (for example according to the embodiment of FIGS. 3 and 5). The processing unit 91 inputs commands (also referred to as "instructions") 94. The processor of the processing unit 91 processes these commands 94 and generates other commands (also referred to as "instructions") 95 at output enabling the control (or commanding) of the different elements comprised in the automated distribution system, especially the sources S1 to S5, the FIFO-type source buffer devices F1 to F5, the collector 1, the destination D1 to D5, the FIFO-type destination buffer devices F1' to F5' and the sequencing and buffer storage systems 91.

This FIG. 4 illustrates only one particular way, among several possible ways, of carrying out the technique of the invention in any one of its embodiments. Indeed, the control system can be carried out equally well on a reprogrammable computing machine (for example a PC computer, a DSP processor, a microcontroller etc.) executing a program comprising a sequence of instructions, or on a dedicated computation machine (for example a set of logic gates such as an FPGA or an ASIC or any other hardware module).

Should the control system be made with a reprogrammable computing machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

FIG. 5 illustrates an algorithm of a particular implementation of the step 31 of FIG. 3 (preparing the collection list LC).

In a step 501, the control system initializes a first set of states E1 with a single state $e_{init}=(U_{init}, L_{init})$, where $U_{init}$ is a k-tuplet containing k zeros and $L_{init}$ is an empty list.

In a step 502, the control system initializes a second set of states E2 with a zero value.

In a test step 503, the control system verifies whether n successive building steps (i.e. all of them) have been carried out.

In the event of a positive response at the test step 503, the control system passes to the step 516 in which it obtains the collection list LC from a single final state $e_F=(U_F, L_F)$ contained in E2. Indeed, it takes $L_F$ as a collection list LC.

In the event of a negative response at the testing step 503, the control system starts the processing of the next building step in passing to the test step 504 in which it verifies whether all the states of E1 have been processed. Each state e of E1 is written as e=(U, L), where U is a k-tuplet containing k elements, $U=(z_1, \ldots, z_k)$ with $z_i$ as a number of loads taken in the $i^{th}$ source buffer device, $i \in \{1, \ldots, k\}$, and L is a list of loads associated with U.

In the event of a positive response at the test step 504, the control system passes to the step 515 in which, if the building step is not the $n^{th}$ building step, E2 becomes the new set of states E1, and then the control system returns to the step 503 (for the passage to the next building step).

In the event of a negative response at the test step 504, the control system takes an unprocessed state E1 and passes to the test step 505 in which it verifies whether all the values of f have been processed with $f \in \{1, \ldots, k\}$.

In the event of a positive response at the step 505, the control system returns to the step 504. In the event of a negative response to the test step 505, the control system takes an unprocessed value of f and passes to the test step 506 in which it verifies whether U(f)<p(f), with U(f) being a number of loads of the $f^{th}$ source buffer device contained in L, and p(f) being the number of loads to be collected in the $f^{th}$ source buffer device.

In the event of a negative response at the test step 506, the control system returns to the step 505. In the event of a positive response at the step 506, the control system passes to the test step 506a in which it verifies whether $N(f)<y_f$, with N(f) being a maximum number of loads of the $f^{th}$ source buffer device placed consecutively in L, and $y_f$ a predetermined value (for example, $y_f=6$).

In the event of a negative response at the test step 506a, the control system returns to the step 505. In the event of a positive response at the test step 506a, the control system passes to the step 507 in which it creates a new state $e_N=(U_N, L_N)$ starting from e=(U, L), in adding 1 to U(f) and adding, at the end of L, the load occupying the $(U(f)+1)^{th}$ position in the sequence of loads contained in the $f^{th}$ source buffer device.

The step 507 is followed by the step 508 in which the control system computes a value of disorder d of the list $L_N$ of the new state $e_N$, with a function of computation of disorder relative to a rising order of sequential order numbers of destination.

In one particular embodiment of the step 508, the control system uses a function of computation of disorder which, for a list M of q loads, is written as follows:

$$H(M) = \sum_{i=1}^{i=q}[(i-1) - K(i)] \quad \text{[Equation 1]}$$

with K(i) being the number of loads of the list M placed before the $i^{th}$ load of the list M and having a sequential order number of destination smaller than or equal to the sequential order number of the $i^{th}$ load of the list M.

Other disorder computation functions can be used without departing from the framework of the present invention, especially but not exclusively:

$$B(M) = MAX(K(i)), i \in \{1, \ldots, q\} \quad \text{[Equation 2]}$$

with K(i) as defined further above.

$$F(M) = \sum_{i=1}^{i=q} |A(i) - i| \quad \text{[Equation 3]}$$

with A(i) being the position that would be occupied by the $i^{th}$ load of the list M if the q loads of the list M were re-ordered according to a rising order of sequential order numbers of destination.

$$G(M) = MAX(|(A(i)-i|), i \in \{1, \ldots, q\} \quad \text{[Equation 4]}$$

with A(i) as defined further above.

For example, with M=(3,1,8,4,7,2,6,5), we obtain:

H(M)=([(1−1)−0]+[(2−1)−0]+[(3−1)−2]+[(4−1)−2]+[(5−1)−3]+[(6−1)−1]+[(7−1)−4]+[(8−1)−4])=12

B(M)=4

F(M)=(|3−1|+|1−2|+|8−3|+|4−4|+|7−5|+|2−6|+|6−7|+|5−8|)=18

G(M)=5

The step 508 is followed by the test step 509 in which the control system verifies whether $d > d_H$, with $d_H$ being a predetermined value.

In one particular embodiment of the step 509, the predetermined value $d_H$ is computed as follows:
  building a reference list $L_H$ that contains the n loads and is built as follows:
    the first load of $L_H$ is the load having the smallest sequential order number of destination among the loads really ready to go out of the k source buffer devices;
    each following load of $L_H$ is the load having the smallest sequential order number of destination among the loads that would be ready to go out of the k source buffer devices in fictitiously assuming that the previous loads of $L_H$ have gone out of the k source buffer devices;
  computing $d_H$ as a value of disorder of the list $L_H$, with the disorder computation function.

In the event of a positive response at the test step 509, the control system returns to the step 505. In the event of a negative response at the test step 509, the control system goes to the test step 510 in which it verifies whether E2 contains another new state $e'_N = (U'_N, L'_N)$, with $U'_N = U_N$ and d' being a value of disorder of the list $L'_N$.

In the event of a positive response at the test step 510, the control system goes to the step 512 in which it verifies whether d<d'. In the event of a positive response at the test step 512, the control system goes to the step 514 in which it replaces $e'_N$ by $e_N$ in E2. In the event of a negative response at the test step 512, the control system goes to the step 513 in which it does not insert $e_N$ into E2. At the end of the step 512 or the step 514, the control system returns to the step 505.

In the event of a negative response at the test step 510, the control system goes to the step 511 in which it inserts $e_N$ into E2, and then returns to the step 505.

Figure 6:
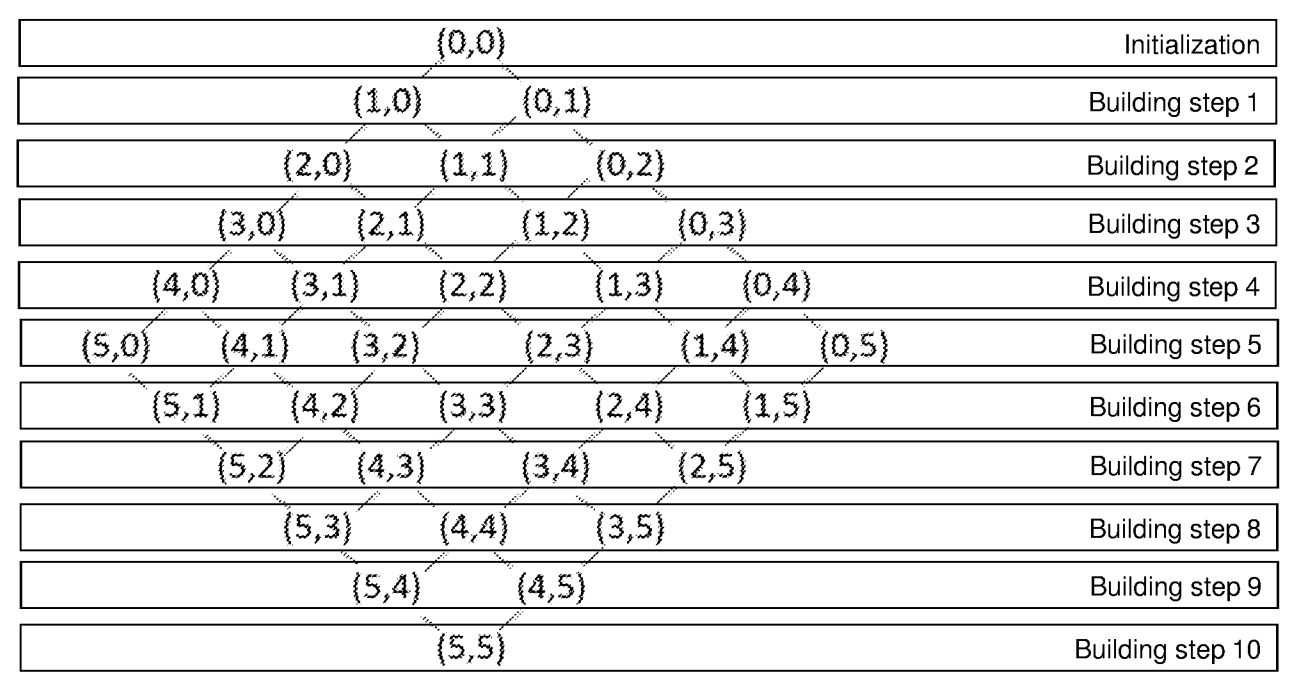
Figure 7A:
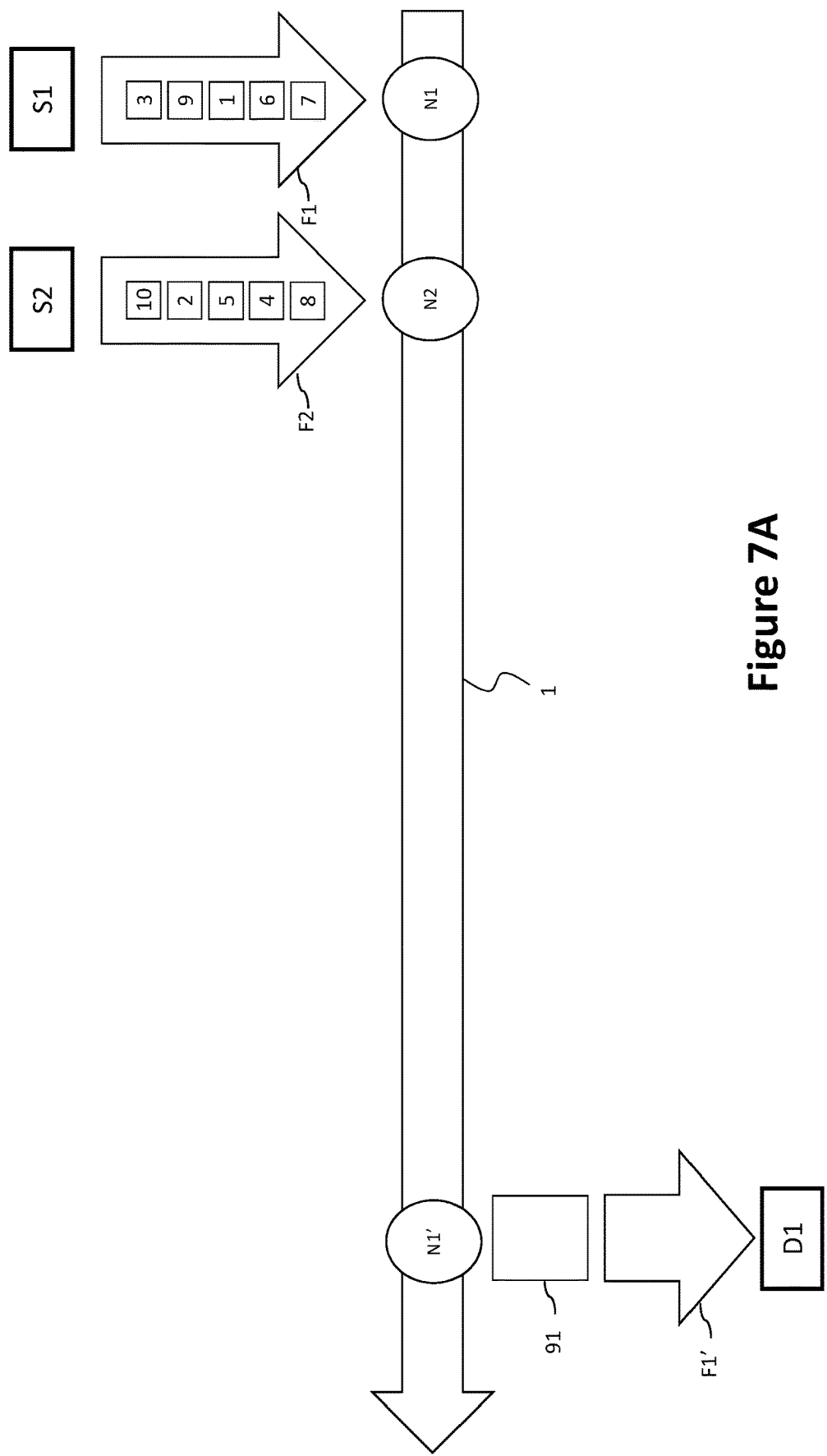
FIGS. 7A, 7B and 7C illustrate three states (loads before collection on the collector, loads after collection on the collector and loads after final scheduling) of the processing of a customer order with a load-sequencing method according to the invention, in a first implementation with a single destination.
Figure 7B:
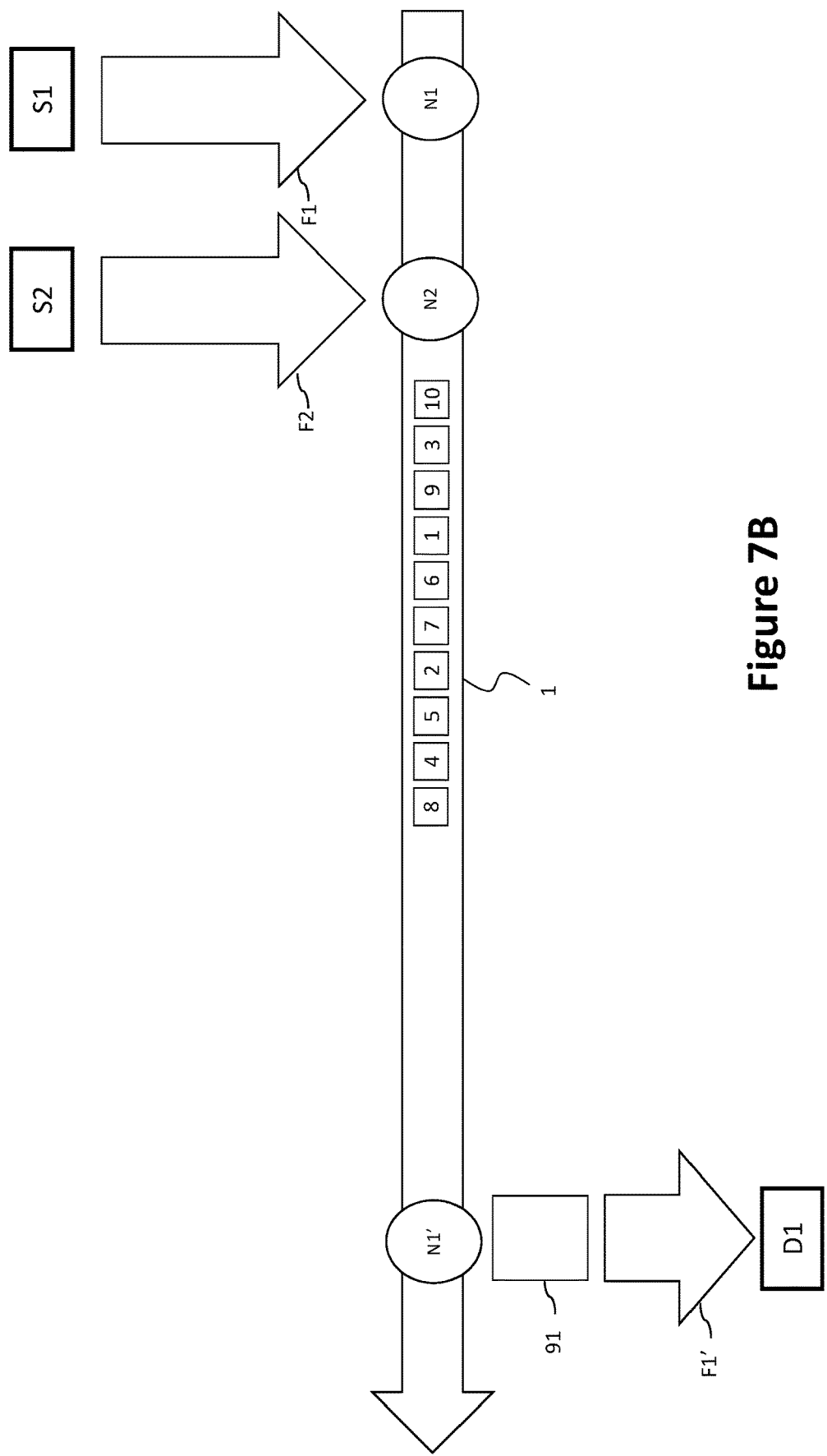
Figure 7C:
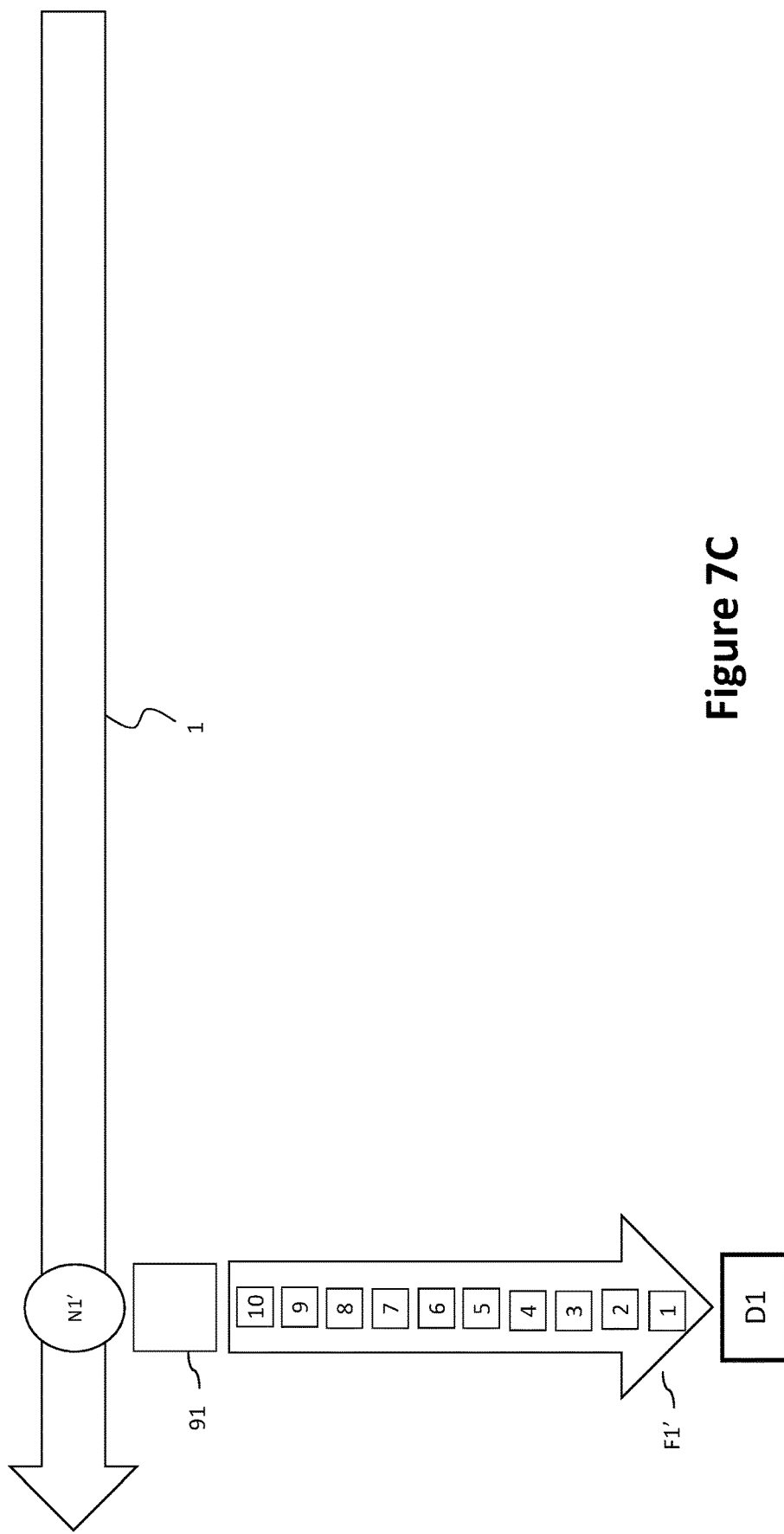

Referring now to FIG. 6 and FIGS. 7A, 7B and 7C, we present the processing of a customer order with a load-sequencing method according to the invention, in a first implementation with only one destination. FIGS. 7A, 7B and 7C respectively illustrate the following three steps of this processing: loads before collection on the collector, loads after collection on the collector and loads after final scheduling.

In this example, it is assumed that there are two sources S1 and S2 and one destination D1. The customer order to be processed lists the following loads: 1, 2, 3, 4, 5, 6, 7, 8, 9 and 10 (in the figures the loads are referenced by their sequential order number of destination).

As illustrated in FIG. 7A, the source buffer device F1 (downstream from the source S1) contains five loads according to the following sequence: 7, 6, 1, 9 and 3. The source buffer device F2 (downstream from the source S2) contains five loads according to the following sequence: 8, 4, 5, 2 and 10. We therefore have, n=10, p(1)=5 and p(2)=5.

The results of the step for initializing E1 and of the n building steps described further above with reference to FIG. 5 are the following (in taking H(M) as a function of computation of the value of disorder d):

Step for Initializing E1
  state $e_{00}$=[U=(0,0); L=( )]; d=0
Building Step 1
  state $e_{10}$=[U=(1,0); L=(8)]; d=0
  state $e_{01}$=[U=(0,1); L=(7)]; d=0
Building Step 2
  state $e_{20}$=[U=(2,0); L=(8,4)]; d=1
  state $e_{11}$=[U=(1,1); L=(7,8)]; d=0
  state $e'_{11}$=[U=(1,1); L=(8,7)]; d=1 (not kept)
  state $e_{02}$=[U=(0,2); L=(7,6)]; d=1
Building Step 3
  state $e_{30}$=[U=(3,0); L=(8,4,5)]; d=2
  state $e_{21}$=[U=(2,1); L=(8,4,7)]; d=2
  state $e'_{21}$=[U=(2,1); L=(7,8,4)]; d=2 (not kept)
  state $e_{12}$=[U=(1,2); L=(7,8,6)]; d=2 (not kept)
  state $e'_{12}$=[U=(1,2); L=(7,6,8)]; d=1
  state $e_{03}$=[U=(0,3); L=(7,6,1)]; d=3
Building Step 4
  state $e_{40}$=[U=(4,0); L=(8,4,5,2)]; d=5
  state $e_{31}$=[U=(3,1); L=(8,4,5,7)]; d=3
  state $e'_{31}$=[U=(3,1); L=(8,4,7,5)]; d=4 (not kept)
  state $e_{22}$=[U=(2,2); L=(8,4,7,6)]; d=4
  state $e'_{22}$=[U=(2,2); L=(7,6,8,4)]; d=4 (not kept)
  state $e_{13}$=[U=(1,3); L=(7,6,8,1)]; d=4 (not kept)
  state $e'_{13}$=[U=(1,3); L=(7,6,1,8)]; d=3
  state $e_{04}$=[U=(0,4); L=(7,6,1,9)]; d=3
Building Step 5
  state $e_{50}$=[U=(5,0); L=(8,4,5,2,10)]; d=5
  state $e_{41}$=[U=(4,1); L=(8,4,5,2,7)]; d=6
  state $e'_{41}$=[U=(4,1); L=(8,4,5,7,2)]; d=7 (not kept)
  state $e_{32}$=[U=(3,2); L=(8,4,5,7,6)]; d=5
  state $e'_{32}$=[U=(3,2); L=(8,4,7,6,5)]; d=7 (not kept)
  state $e_{23}$=[U=(2,3); L=(8,4,7,6,1)]; d=8 (not kept)
  state $e'_{23}$=[U=(2,3); L=(7,6,1,8,4)]; d=6
  state $e_{14}$=[U=(1,4); L=(7,6,1,8,9)]; d=3
  state $e'_{14}$=[U=(1,4); L=(7,6,1,9,8)]; d=4 (not kept)
  state $e_{05}$=[U=(0,5); L=(7,6,1,9,3)]; d=6
Building Step 6
  state $e_{51}$=[U=(5,1); L=(8,4,5,2,10,7)]; d=7 (not kept)
  state $e'_{51}$=[U=(5,1); L=(8,4,5,2,7,10)]; d=6
  state $e_{42}$=[U=(4,2); L=(8,4,5,2,7,6)]; d=8
  state $e'_{42}$=[U=(4,2); L=(8,4,5,7,6,2)]; d=10 (not kept)
  state $e_{33}$=[U=(3,3); L=(8,4,5,7,6,1)]; d=10 (not kept)
  state $e'_{33}$=[U=(3,3); L=(7,6,1,8,4,5)]; d=9 state $e_{24}$=[U=(2,4); L=(7,6,1,8,4,9)]; d=6
state $e'_{24}$=[U=(2,4); L=(7,6,1,8,9,4)]; d=7 (not kept)
state $e_{15}$=[U=(1,5); L=(7,6,1,8,9,3)]; d=7
state $e'_{15}$=[U=(0,5); L=(7,6,1,9,3,8)]; d=7 (not kept)
Building Step 7
state $e_{52}$=[U=(5,2); L=(8,4,5,2,7,10,6)]; d=9 (not kept)
state $e'_{52}$=[U=(5,2); L=(8,4,5,2,7,6,10)]; d=8
state $e_{43}$=[U=(4,3); L=(8,4,5,2,7,6,1)]; d=14
state $e'_{43}$=[U=(4,3); L=(7,6,1,8,4,5,2)]; d=14 (not kept)
state $e_{34}$=[U=(3,4); L=(7,6,1,8,4,5,9)]; d=9
state $e'_{34}$=[U=(3,4); L=(7,6,1,8,4,9,5)]; d=10 (not kept)
state $e_{25}$=[U=(2,5); L=(7,6,1,8,4,9,3)]; d=11
state $e'_{25}$=[U=(2,5); L=(7,6,1,8,9,3,4)]; d=11 (not kept)
Building Step 8
state $e_{53}$=[U=(5,3); L=(8,4,5,2,7,6,10,1)]; d=15 (not kept)
state $e'_{53}$=[U=(5,3); L=(8,4,5,2,7,6,1,10)]; d=14
state $e_{44}$=[U=(4,4); L=(8,4,5,2,7,6,1,9)]; d=14
state $e'_{44}$=[U=(4,4); L=(7,6,1,8,4,5,9,2)]; d=15 (not kept)
state $e_{35}$=[U=(3,5); L=(7,6,1,8,4,5,9,3)]; d=15
state $e'_{35}$=[U=(3,5); L=(7,6,1,8,4,9,3,5)]; d=15 (not kept)
Building Step 9
state $e_{54}$=[U=(5,4); L=(8,4,5,2,7,6,1,10,9)]; d=15 (not kept)
state $e'_{54}$=[U=(5,4); L=(8,4,5,2,7,6,1,9,10)]; d=14
state $e_{45}$=[U=(4,5); L=(8,4,5,2,7,6,1,9,3)]; d=20
state $e'_{45}$=[U=(4,5); L=(7,6,1,8,4,5,9,3,2)]; d=22 (not kept)
Building Step 10
state $e_{55}$=[U=(5,5); L=(8,4,5,2,7,6,1,9,10,3)]; d=21 (not kept)
state $e'_{55}$=[U=(5,5); L=(8,4,5,2,7,6,1,9,3,10)]; d=20

The state $e'_{55}$ is therefore the final state, of which the list L=(8,4,5,2,7,6,1,9,3,10) is taken as a collection list LC. This is illustrated in FIG. 7B. After the list is re-ordered (final scheduling) by the sequencing and buffer storage system 91, we obtain the list (1,2,3,4,5,6,7,8,9,10), as illustrated in FIG. 7C.

FIG. 6 illustrates the tree of states (and more precisely of the values of U of these states) browsed in this example by the algorithm of FIG. 5.

Figure 8A:
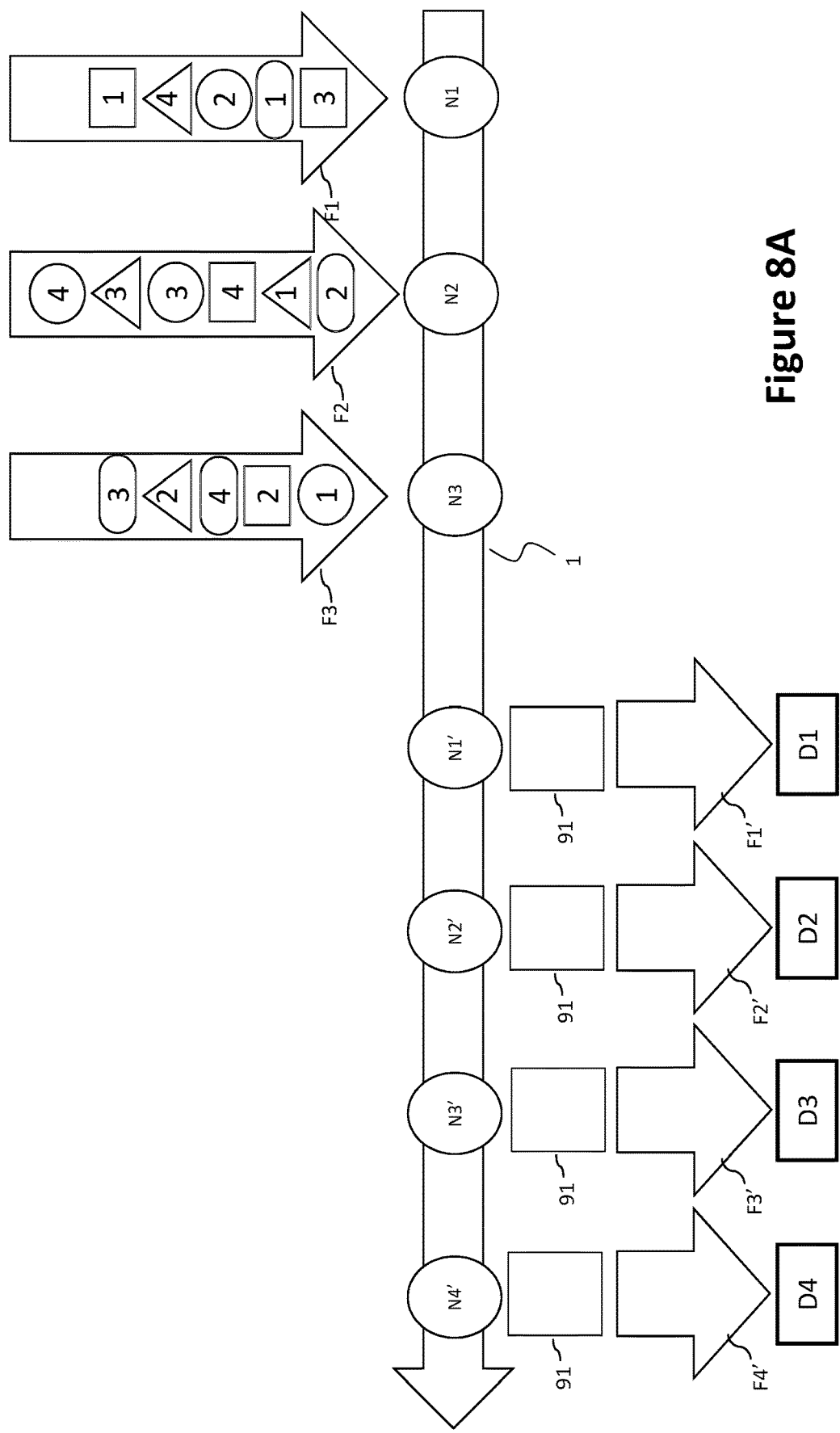
FIGS. 8A, 8B and 8C illustrate three states (loads before collection on the collector, loads after collection on the collector and loads after final scheduling) of the processing of a customer order with a load-sequencing method according to the invention, in a second implementation with several destinations.
Figure 8B:
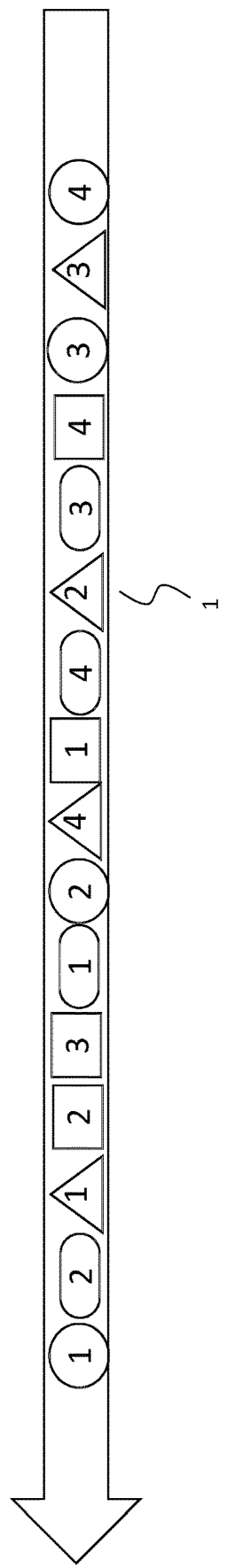
Figure 8C:
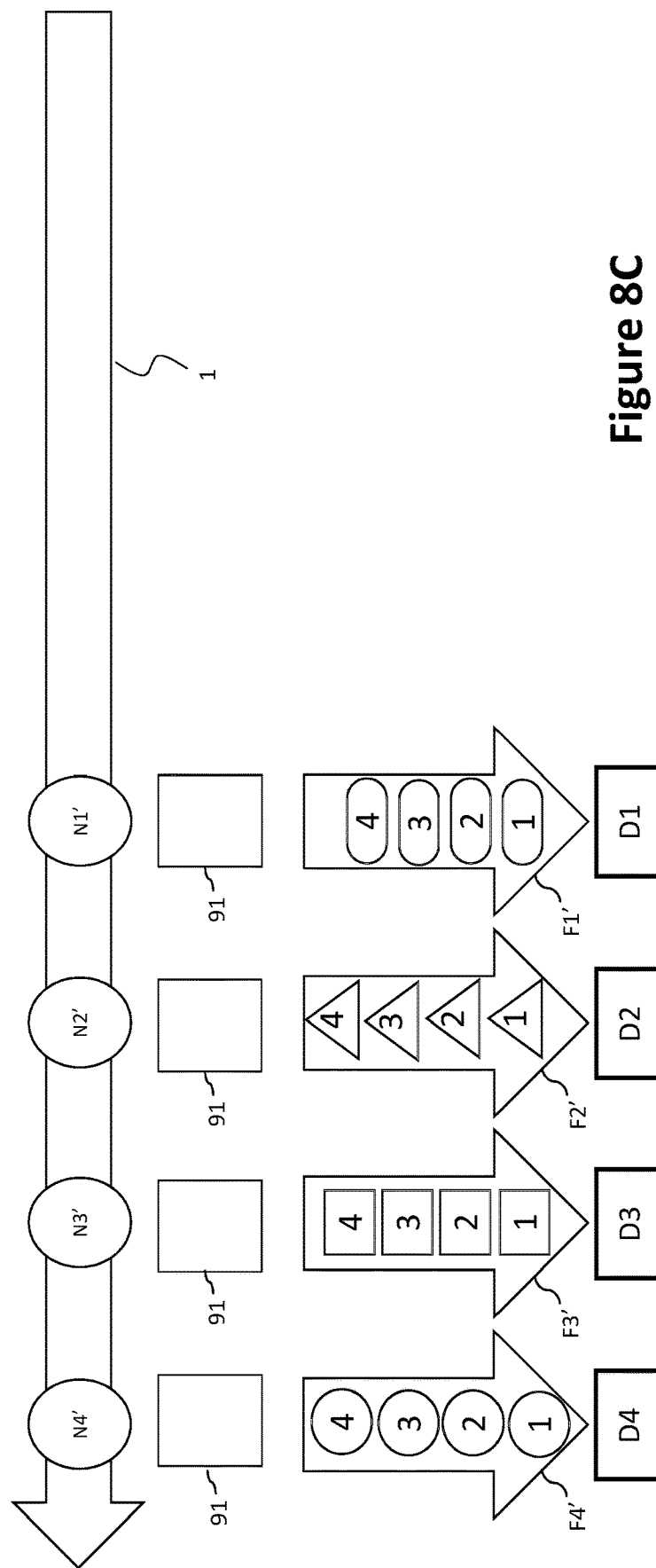

Referring now to FIGS. 8A, 8B and 8C, we present the processing of a customer order with a load-sequencing method according to the invention, in a second implementation with several destinations. FIGS. 8A, 8B and 8C respectively illustrate the following three states of this processing: loads before collection on the collector, loads after collection on the collector and loads after final scheduling.

In this example, it is assumed that there are three sources S1, S2 and S3 and four destinations D1, D2, D3 and D4. There are two customer orders to be processed, one for each of the destinations. Each of these customer orders lists four loads having the following sequential order numbers of destination: 1, 2, 3 and 4. In the figures, the loads are referenced by their sequential order number of destination as well as by a geometrical code corresponding to their destination (oval for D1, triangle for D2, rectangle for D3 and circle for D4).

As illustrated in FIG. 8A, the source buffer device F1 (downstream from the source S1) contains five loads according to the following sequence: 3r, 1o, 2c, 4t and 1r (where the letters o, t, r and c respectively correspond to "oval", "triangle", "rectangle" and "circle", to indicate their destination (D1, D2, D3 and D4 respectively). The source buffer device F2 (downstream from the source S2) contains six loads according to the following sequence: 2o, 1t, 4r, 3c, 3t and 4c. The source buffer device F3 (downstream from the source S3) contains five loads in the following sequence: 1c, 2r, 4o, 2t and 3o. We therefore have, n=16, p(1)=5, p(2)=6 and p(3)=5.

FIG. 8B illustrates the collection list obtained by applying the algorithm of FIG. 5: LC=(1c, 2o, 1t, 2r, 3r, 1o, 2c, 4t, 1r, 4o, 2t, 3o, 4r, 3c, 3t, 4c). A disorder is noted because of the positioning of the loads 1r and 3o.

FIG. 8C illustrates the loads sequenced accurately in the different destination buffer devices F1' to F5', after re-ordering (final scheduling) by the sequencing and buffer storage systems 91.

Figure 9A:
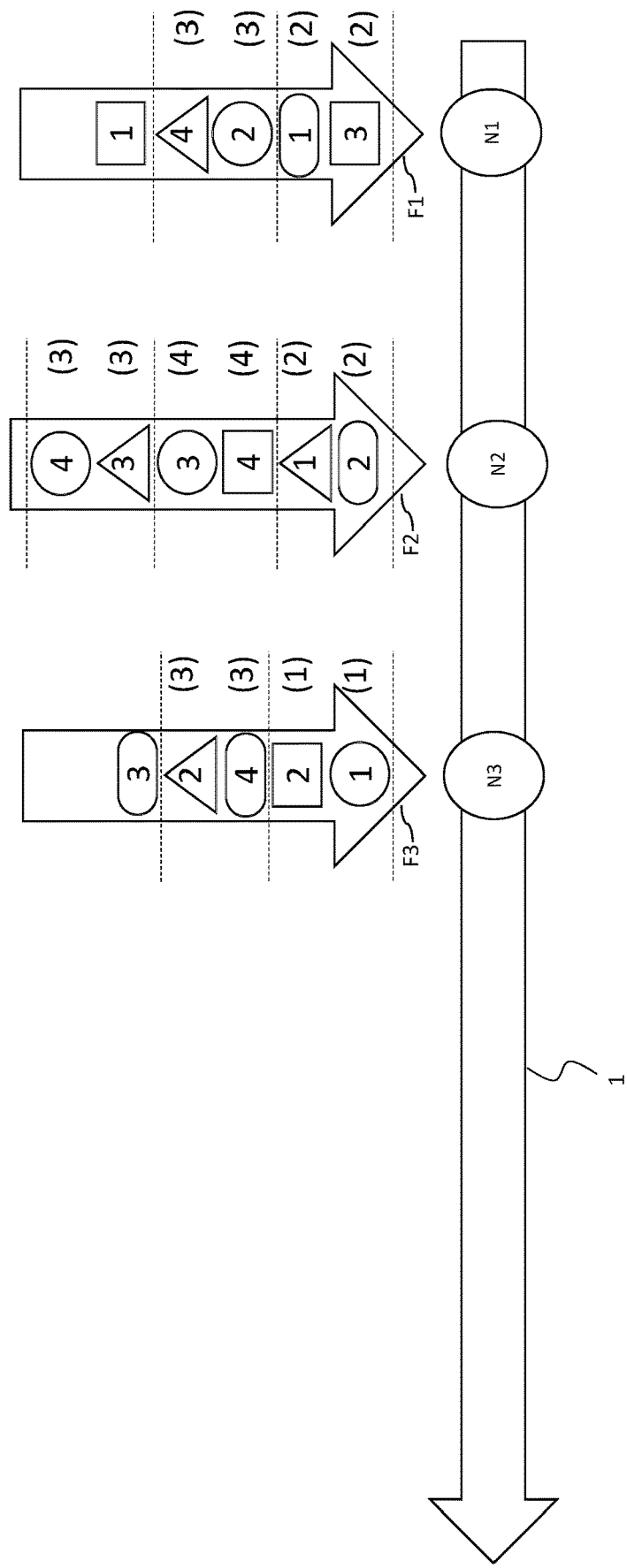
FIGS. 9A and 9B illustrate two states (loads before collection on the collector and loads after collection on the collector) of the processing of a customer order with a load-sequencing method according to the invention, in a third implementation with a use of substitute sequential order numbers of destination.
Figure 9B:
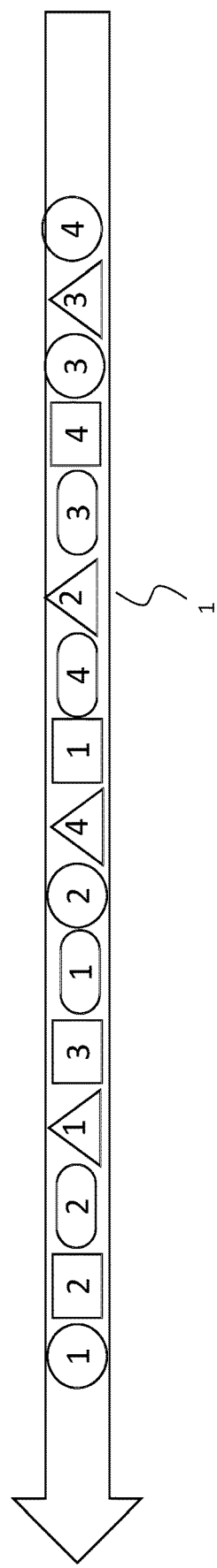

Referring now to FIGS. 9A and 9B, we present the processing of a customer order with a load-sequencing method according to the invention in a third implementation with use of substitute sequential order numbers of destination. FIGS. 9A and 9B respectively illustrate the two following states of this processing: loads before collection on the collector and loads after collection on the collector.

We take the case (the variant referred further above) where the load-sequencing method of FIG. 3 comprises a preliminary step 30 (before the step 31 for building the collection list). In this preliminary step 30, the control system computes the substitute sequential order numbers of destination as a function of the sequential order numbers of destination of the loads contained in the source buffer devices F1 to F5. More specifically, for at least one group (or each group in one particular embodiment) of R successive loads contained in one of the source buffer devices with R as an integer greater than or equal to 2: the system computes a substitute order number of destination as a function of the sequential order numbers of destination of the R loads. Then, during the execution of the step 31 for building the collection list, the control system uses the substitute sequential order number of destination for each of the R loads.

In one particular embodiment, the computation made at the step 30 comprises the following for each group of R loads:
  computing an average value of the sequential order numbers of destination of the R loads;
  computing a value of disorder of the R loads as a function of the sequential order numbers of destination of the R loads (examples of disorder computation functions have already been described further above);
  if the value of disorder of the R loads is greater than a predetermined threshold S, the substitute sequential order number of destination is the average value rounded up to the next integer; if not the substitute sequential order number of destination is the average value rounded down to the next integer.

The predetermined threshold is for example: S=0. In this case, we take the average value rounded down to the next integer only if there is no disorder in the R loads. In one variant, S is greater than zero (for example S=4). In this case we accept a tolerance value that takes the average value rounded down to the lower integer so long as the disorder in the R loads is smaller than S.

In the example illustrated in FIG. 9A, it is assumed that, in the example of FIG. 8A, there are three sources S1, S2 and S3 (and therefore three source buffer devices F1, F2 and F3), four destinations D1, D2, D3 and D4 and four customer orders to be processed (one for each of the destinations). We add the following constraint: the loads of the source buffer devices must be collected R by R (i.e. R at a time) on the collector 1 (with R=2 in this example).

In the example of FIG. 9A, we have the following groups (demarcated by dashes): for the source buffer device F1, (3r,1o) and (2c,4t) (since the load 1r is alone, it is not taken into account); for the source buffer device F2, (2o,1t), (4r,3c) and (3t,4c); for the source buffer device F3, (1c,2r) and (4o,2t) (since the load 3o is alone, it is not taken into account). In this example, the loads 1r and 3o are not part of a group of loads. Therefore for them there is no computation of a substitute order number of destination. They are not taken into account in the step 31 for building the collection list (in other words, they are not part of the n loads to be collected). They will be taken into account when the control system 90 launches a new execution of the steps of the method in the event of modification of the set of n loads to be collected (i.e. in the event of a positive response at the test step 34). In one variant, or else if there is no modification of the set of n loads to be collected, the loads 1r and 3o (with their sequential order number of destination) are immediately taken into account in the step 31 for building the collection list.

For each of these groups, the result of the computation of the step 30 (taking S=0) is indicated between brackets to the right of each load of the group. Let us consider two examples with different rounded out values:

for the group (2o,1t) of the source buffer device F2: the substitute sequential order number of destination is 2 (the average of 2 and 1=1.5; value rounded up to the next integer because there is disorder in the two loads);

for the group (1c,2r) of the source buffer device F3: the substitute sequential order number of destination is 1 (the average of 1 and 2=1.5; value rounded down to the next integer because there is no disorder in the two loads).

FIG. 9B illustrates the collection list obtained by applying the algorithm of FIG. 5 with the substitute sequential order numbers of destination (except for the loads 1r and 3o which are taken into account with their sequential order number of destination): LC=(1c, 2r, 2o, 1t, 3r, 1o, 2c, 4t, 1r, 4o, 2t, 3o, 4r, 3c, 3t, 4c).

The invention claimed is:

1. A method for sequencing loads, implemented by a control system in an automated load-distribution system comprising:
   k sources with k≥2;
   at least one destination;
   k source buffer devices which are first-in first-out buffers, each receiving loads coming from one of the k sources;
   a collector collecting the loads coming out of the k source buffer devices and transporting them to said at least one destination, the collector comprising k successive nodes each configured to collect the loads coming out of one of the source buffer devices; and
   said control system configured to process customer orders, each customer order listing loads for a given destination and being each associated with a sequential order number of destination;
   wherein the method comprises the following acts performed by the control system:
   building a collection list containing n loads to be collected and reducing a disorder of said n loads relative to a rising order of the sequential order numbers of destination, said n loads being contained in the source buffer devices, $n=\sum_{i=1}^{i=k} p(i)$, with p(i) being a number of loads to be collected in the $i^{th}$ source buffer device; and
   controlling the collector and the source buffer devices to carry out a collection of loads on the collector in compliance with said collection list,
   wherein the act of building the collection list comprises the following acts:

(a) initializing a first set of states E1 with a single state $e_{init}=(U_{init}, L_{init})$, where $U_{init}$ is a k-tuple containing k zeros and $L_{init}$ is an empty list;

(b) initializing a second set of states E2 with an empty value;

(c) for each building act among n successive building acts:

(c.1) for each state e of E1, with e=(U, L), where U is a k-tuple containing k elements, $U=(z_1, \ldots, z_k)$ with $z_i$ a number of loads taken from the $i^{th}$ source buffer device, i∈{1, ..., k}, and L is a list of loads associated with U:

(c.1.1) for each value of f∈{1, ..., k}:

(c.1.1.1) if U(f)<p(f), with U(f) being a number of loads of the $f^{th}$ source buffer device contained in L, and p(f) the number of loads to be collected in the $f^{th}$ source buffer device:

-i- creating a new state $e_N=(U_N,L_N)$ starting from e=(U, L), in adding 1 to U(f) and in adding, at the end of L, the load occupying the $(U(f)+1)^{th}$ position in the sequence of loads contained in the $f^{th}$ source buffer device;

-ii- computing a value of disorder d of the list $L_N$ of the new state $e_N$, with a function of computation of disorder relative to a rising order of the sequential order numbers of destination;

-iii- if E2 contains another new state $e'_N=(U'_N, L'_N)$, with $U'_N=U_N$ and d' a value of disorder of the list $L'_N$: if d<d', $e_N$ replaces $e'_N$ in E2, and if d≥d', $e_N$ is not inserted into E2;

-iv- if E2 does not contain said other new state $e'_N$, $e_N$ is inserted into E2;

(c.2) if the building act is not the $n^{th}$ building act: E2 becomes the new set of states E1 and the method passes to the next building act;

(c.3) if the building act is the $n^{th}$ building act: E2 contains a single final state $e_F=(U_F,L_F)$ and $L_F$ forms said collection list.

2. The method according to claim 1, wherein, at the act (c.1.1.1), the control system also verifies whether $N(f)<y_f$, with N(f) being the longest sequence of loads of the $f^{th}$ source buffer device placed consecutively in L, and $y_f$ being a predetermined threshold, and wherein the acts (i) to (iv) are carried out only if U(f)<p(f) and $N(f)<y_f$.

3. The method according to claim 1, wherein the act -ii- is followed by the following act:

-iia- if $d>d_H$, with $d_H$ being a predetermined value, the new state $e_1$ is not inserted into E2 and the acts (iii) and (iv) are not carried out.

4. The method according to claim 3, comprising computing the predetermined value $d_H$ as follows:

building a reference list $L_H$ containing said n loads and built as follows:
   the first load of $L_H$ is a load having the smallest sequential order number of destination among the loads truly ready to go out of the k source buffer devices; and
   each following load of $L_H$ is the load having the smallest sequential order number of destination among the loads that are ready to go out of the k source buffer devices, assuming fictitiously that the preceding loads of $L_H$ have come out of the k source buffer devices; and
computing $d_H$ as a value of disorder of the list $L_H$, with said disorder computing function.

5. The method according to claim 1, wherein said disorder computing function, for a list M of q loads, is written:
$H(M)=\sum_{i=1}^{i=q}[(i-1)-K(i)]$, with $K(i)$ being the number of loads of the list M placed before the $i^{th}$ load of the list M and having a sequential order number of destination smaller than or equal to the sequential order number of the $i^{th}$ load of the list M.

6. The method according to claim 1, wherein the loads of a given customer order must reach a given destination in a given rising sequential order of destination, and wherein said control system carries out an act of controlling at least one sequencing device, placed between the collector and said at least one destination, to make a correction of the disorder of the n loads.

7. The method according to claim 1, wherein the control system performs the following act, before the act of building the collection list, for at least one group of R successive loads contained in one of the source buffer devices, with R being an integer greater than or equal to 2:
computing a substitute sequential order number of destination as a function of the sequential order numbers of destination of the R loads; and
wherein, for the execution of the act of building the collection list, the control system uses the substitute sequential order number of destination for each of the R loads.

8. The method according to claim 7, wherein the computation of a substitute sequential order number of destination as a function of the sequential order numbers of destination of the R loads comprises:
computing an average value of the sequential order numbers of destination of the R loads;
computing a value of disorder of the R loads as a function of the sequential order numbers of destination of the R loads;
if the value of disorder of the R loads is above a predetermined threshold, the substitute sequential order number of destination is the average value rounded up to the next integer; if not, the substitute sequential order number of destination is an average value rounded down to the next integer.

9. The method according to claim 1, wherein a new execution of the acts of the method is launched if an entry of at least one new load into one of the source buffer devices prompts a modification of the loads to be collected in said source buffer device and therefore of the n loads to be collected in the set of the k source buffer devices.

10. A non-transitory computer-readable storage medium storing a computer program comprising program code instructions for implementing a method for sequencing loads by a control system in an automated load-distribution system, when said program is executed on a computer of the control system, wherein:
the control system comprises:
k sources with k≥2;
at least one destination;
k source buffer devices which are first-in first-out buffers, each receiving loads coming from one of the k sources;
a collector collecting the loads coming out of the k source buffer devices and transporting them to said at least one destination, the collector comprising k successive nodes each configured to collect the loads coming out of one of the source buffer devices; and
said control system configured to process customer orders, each customer order listing loads for a given destination and being each associated with a sequential order number of destination;
and wherein the instructions configure the control system to perform acts comprising:
building a collection list containing n loads to be collected and reducing a disorder of said n loads relative to a rising order of the sequential order numbers of destination, said n loads being contained in the source buffer devices, $n=\sum_{i=1}^{i=k}p(i)$, with $p(i)$ being a number of loads to be collected in the $i^{th}$ source buffer device; and
controlling the collector and the source buffer devices to carry out a collection of loads on the collector in compliance with said collection list,
wherein the act of building the collection list comprises the following acts:
(a) initializing a first set of states E1 with a single state $e_{init}=(U_{init}, L_{init})$, where $U_{init}$ is a k-tuple containing k zeros and $L_{init}$ is an empty list;
(b) initializing a second set of states E2 with an empty value;
(c) for each building act among n successive building acts:
(c.1) for each state e of E1, with e=(U, L), where U is a k-tuple containing k elements, $U=(z_1, \ldots, z_k)$ with $z_i$ a number of loads taken from the $i^{th}$ source buffer device, i∈{1, ..., k}, and L is a list of loads associated with U:
(c.1.1) for each value of f∈{1, ..., k}:
(c.1.1.1) if U(f)<p(f), with U(f) being a number of loads of the $f^{th}$ source buffer device contained in L, and p(f) the number of loads to be collected in the $f^{th}$ source buffer device:
-i- creating a new state $e_N=(U_N,L_N)$ starting from e=(U, L), in adding 1 to U(f) and in adding, at the end of L, the load occupying the $(U(f)+1)^{th}$ position in the sequence of loads contained in the $f^{th}$ source buffer device;
-ii- computing a value of disorder d of the list $L_N$ of the new state $e_N$, with a function of computation of disorder relative to a rising order of the sequential order numbers of destination;
-iii- if E2 contains another new state $e'_N=(U'_N, L'_N)$, with $U'_N=U_N$ and d' a value of disorder of the list $L'_N$: if d<d', $e_N$ replaces $e'_N$ in E2, and if d≥d', $e_N$ is not inserted into E2;
-iv- if E2 does not contain said other new state $e'_N$, $e_N$ is inserted into E2;
(c.2) if the building act is not the $n^{th}$ building act: E2 becomes the new set of states E1 and the method passes to the next building act;
(c.3) if the building act is the $n^{th}$ building act: E2 contains a single final state $e_F=(U_F,L_F)$ and $L_F$ forms said collection list.

11. Automated load distribution system comprising:
k sources with k≥2;
at least one destination;
k source buffer devices, which are first-in first-out buffers, each receiving loads coming from one of the k sources;
a collector collecting loads going out of the k source buffer devices and transporting them towards said at least one destination, the collector comprising k successive nodes each configured to collect the loads going out of one of the k source buffer devices; and
a control system configured to process customer orders, each customer order listing loads for a given destination and each being associated with a sequential order number of destination; wherein said control system comprises a computation machine configured to:

build a collection list containing n loads to be collected and reducing a disorder of said n loads relative to a rising order of the sequential order numbers of destination, said n loads being contained in the source buffer devices, with $n=\Sigma_{i=1}^{i=k} p(i)$, p(i) being a number of loads to be collected in the $i^{th}$ source buffer device; and control the collector and the source buffer devices for a collection of loads on the collector compliant with said collection list;

and wherein the computation machine is configured to build the collection list in carrying out the following acts:

(a) initializing a first set of states E1 with a single state $e_{init}=(U_{init}, L_{init})$, where $U_{init}$ is a k-tuple containing k zeros and $L_{init}$ is an empty list;

(b) initializing a second set of states E2 with an empty value;

(c) for each building act among n successive building acts:

(c.1) for each state e of E1, with e=(U, L), where U is a k-tuple containing k elements, $U=(z_1, \ldots, z_k)$ with $z_i$ a number of loads taken from the $i^{th}$ source buffer device, $i \in \{1, \ldots, k\}$, and L is a list of loads associated with U:

(c.1.1) for each value of $f \in \{1, \ldots, k\}$:

(c.1.1.1) if U(f)<p(f), with U(f) being a number of loads of the $f^{th}$ source buffer device contained in L, and p(f) is the number of loads to be collected in the $f^{th}$ source buffer device:

-i- creation of a new state $e_N=(U_N, L_N)$ starting from e=(U, L), in adding 1 to U(f) and in adding, at the end of L, the load occupying the $(U(f)+1)^{th}$ position in the sequence of loads contained in the $f^{th}$ source buffer device;

-ii- computing a value of disorder d of the list $L_N$ of the new state $e_N$, with a function of computation of disorder relative to a rising order of the sequential order numbers of destination;

-iii- if E2 contains another new state $e'_N=(U'_N, L'_N)$, with $U'_N=U_N$ and d' a value of disorder of the list $L'_N$: if d<d', $e_N$ replaces $e'_N$ in E2, and if d>d', $e_N$ is not inserted into E2;

-iv- if E2 does not contain said other new state $e'_N$, $e_N$ is inserted into E2;

(c.2) if the building act is not the $n^{th}$ building act: E2 becomes the new set of states E1 and the method passes to the next building act;

(c.3) if the building act is the $n^{th}$ building act: E2 contains a single final state $e_F=(U_F, L_F)$ and $L_F$ forms said collection list.

* * * * *